US009946759B2

(12) United States Patent
Abou Mahmoud et al.

(10) Patent No.: US 9,946,759 B2
(45) Date of Patent: *Apr. 17, 2018

(54) VISUAL IMPORTANCE INDICATION ENHANCEMENT FOR COLLABORATION ENVIRONMENTS

(71) Applicant: International Business Machines Corporation, Armonk, NY (US)

(72) Inventors: Alaa Abou Mahmoud, Dracut, MA (US); Paul R. Bastide, Boxford, MA (US); Shane M. Kilmon, Tyngsborough, MA (US); Ralph E. LeBlanc, Jr., Pepperell, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

This patent is subject to a terminal disclaimer.

(21) Appl. No.: 14/100,388

(22) Filed: Dec. 9, 2013

(65) Prior Publication Data

US 2015/0163321 A1    Jun. 11, 2015

(51) Int. Cl.
*G06F 17/30* (2006.01)
*H04L 12/58* (2006.01)
(Continued)

(52) U.S. Cl.
CPC ...... *G06F 17/3053* (2013.01); *H04L 12/1827* (2013.01); *H04L 51/04* (2013.01); *H04L 67/306* (2013.01); *H04L 51/32* (2013.01)

(58) Field of Classification Search
CPC ... H04L 51/32; H04L 67/306; G06F 17/3007; G06F 17/3053
See application file for complete search history.

(56) References Cited

U.S. PATENT DOCUMENTS

2003/0191969 A1* 10/2003 Katsikas .............. G06Q 10/107
726/12
2005/0114207 A1* 5/2005 Jania ................. G06F 17/30867
705/14.4
(Continued)

FOREIGN PATENT DOCUMENTS

WO    2012/116236 A2    8/2012

OTHER PUBLICATIONS

U.S. Office Action dated Jun. 21, 2014 in U.S. Appl. No. 14/290,506, pp. 1-14.
(Continued)

*Primary Examiner* — Sherrod Keaton
(74) *Attorney, Agent, or Firm* — Scully, Scott, Murphy & Presser, P.C.; Robert C. Bunker

(57) ABSTRACT

A system and method for visual importance indication enhancement for collaborative environments comprises a processor for establishing a set of attributes for a primary participant based on attributes obtained from data sources accessible by the primary participant, generating a dynamic rule in accordance with the set of attributes, applying the dynamic rule to an activity stream comprising one or more messages to obtain points of commonality between a participant and the primary participant and determining an importance level of at least one of the one or more messages, and visually indicating the points of commonality and the importance level of the at least one message as a display on a display device. The system can further comprise computer readable storage medium for storing data including the set of attributes.

18 Claims, 3 Drawing Sheets

(51) Int. Cl.
*H04L 29/08* (2006.01)
*H04L 12/18* (2006.01)

(56) References Cited

U.S. PATENT DOCUMENTS

| | | | |
|---|---|---|---|
| 2005/0204001 A1* | 9/2005 | Stein | G06Q 10/107 |
| | | | 709/206 |
| 2005/0267944 A1* | 12/2005 | Little, II | G06Q 10/107 |
| | | | 709/207 |
| 2007/0073904 A1* | 3/2007 | Leung | H04N 21/4345 |
| | | | 709/247 |
| 2008/0040474 A1* | 2/2008 | Zuckerberg | G06Q 30/02 |
| | | | 709/224 |
| 2011/0047228 A1 | 2/2011 | Balasaygun | |
| 2011/0153740 A1 | 6/2011 | Smith et al. | |
| 2011/0246907 A1 | 10/2011 | Wang et al. | |
| 2013/0204940 A1* | 8/2013 | Kinsel | G06Q 30/02 |
| | | | 709/204 |

OTHER PUBLICATIONS

Office Action dated Sep. 8, 2017 received in U.S. Appl. No. 14/290,506, 16 pages.
otice of Allowance dated Dec. 13, 2017 in U.S. Application No. 14/290,506, 16 pages.

\* cited by examiner

VISUAL IMPORTANCE INDICATION ENHANCEMENT FOR COLLABORATION ENVIRONMENTS

FIELD

The present disclosure relates to a method and system for visual importance indication enhancement for collaborative environments.

BACKGROUND

Electronic communications, particularly in collaborative environments such as online social networks and media, e-mail, and short message service (SMS) messages, are increasingly pushing the limits of a person's ability to maintain stable social relationships in a meaningful way. Users employ strategies like organizing electronic communication into folders or groups, and marking messages in unique ways according to their types. The marking of these messages indicates context, and alleviates the burden of receiving so many communications, enabling a user to maintain specific relationships. Current methods filter out the noise in these electronic communications to focus on specific types and forms of a communication, thus establishing a very specific form of attention management. This approach leads to a common problem in which the outliers of the communication method and the users outside the current context of the filters are unable to effectively engage with the user.

BRIEF SUMMARY

According to an aspect of the disclosure, a method of visual importance indication enhancement for collaborative environments comprises establishing a set of attributes for a primary participant based on attributes obtained from data sources accessible by the primary participant, generating a dynamic rule in accordance with the set of attributes, applying the dynamic rule to an activity stream comprising one or more messages to obtain points of commonality between a participant and the primary participant and to determine an importance level of at least one of the one or more messages, and visually indicating the points of commonality and the importance level of the at least one message.

According to another aspect of the disclosure, a system for visual importance indication enhancement for collaborative environments comprises a processor for establishing a set of attributes for a primary participant based on attributes obtained from data sources accessible by the primary participant, and for generating a dynamic rule in accordance with the set of attributes, a display device, and a computer readable storage medium for storing data including the set of attributes, the computer readable storage medium communicating with the processor for applying the dynamic rule to an activity stream comprising one or more messages to obtain points of commonality between a participant and the primary participant and determining an importance level of at least one of the one or more messages, and the processor visually indicating the points of commonality and the importance level of the at least one message as a display on the display device.

In another aspect according to the disclosure, a computer readable storage medium stores a program of instructions executable by a machine to perform a method of visual importance indication enhancement for collaborative environments comprising establishing a set of attributes for a primary participant based on attributes obtained from data sources accessible by the primary participant, generating a dynamic rule in accordance with the set of attributes, applying the dynamic rule to an activity stream comprising one or more messages to obtain points of commonality between a participant and the primary participant and to determine an importance level of at least one of the one or more messages, and visually indicating the points of commonality and the importance level of the at least one message.

Further features as well as the structure and operation of various embodiments are described in detail below with reference to the accompanying drawings. In the drawings, like reference numbers indicate identical or functionally similar elements.

DETAILED DESCRIPTION

Figure 1:
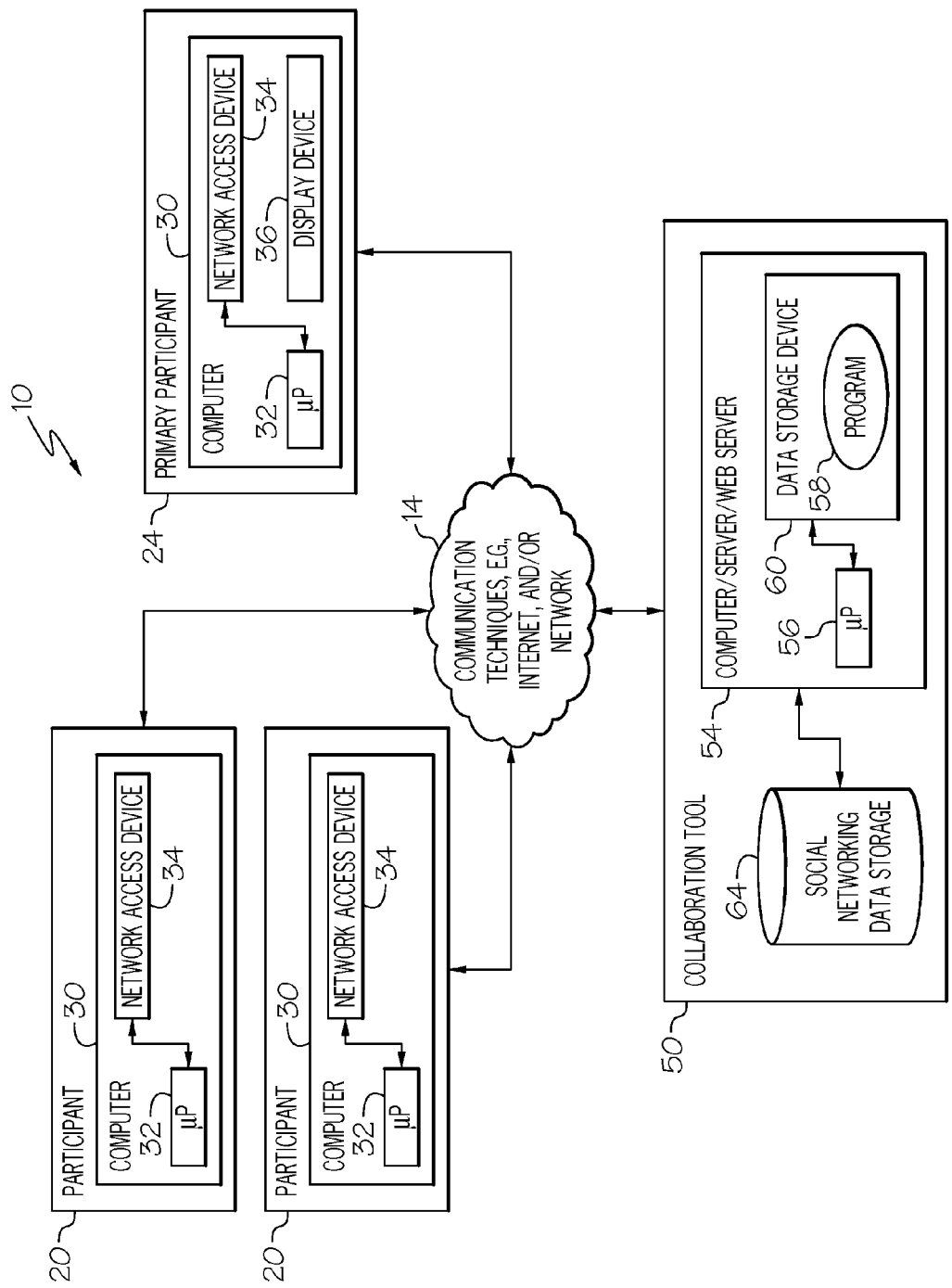
FIG. 1 is a schematic diagram illustrating an overview of the methodology of the present disclosure in an embodiment.
Figure 2:
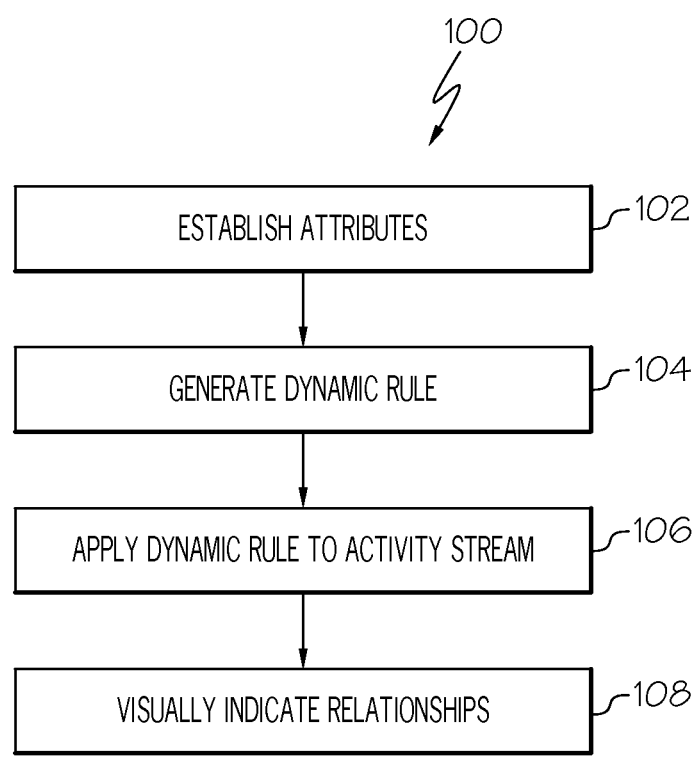
FIG. 2 is a flow diagram illustrating a method for visual importance indication enhancement for collaborative environments according to one embodiment of the present disclosure.

Referring to FIGS. 1 and 2, a system 10 and method 100 is depicted for visual importance indication enhancement for collaborative environments according to the disclosure in one embodiment. The system 10 includes computers 30 used by a plurality of participants or users 20 related to a primary participant or user 24 in a collaborative environment, each computer having a collaborative tool 50 and a processor 32. The computer 30 may access a network 14, e.g., the Internet, to enter and navigate the collaborative tool 50 on a website using a network access device 34. The computer may have a display device 36. In the embodiment of the invention shown in FIG. 1, two users 20 are shown for illustrative purposes, however, any number of users can be connected and/or have a profile or other type of account on the collaborative tool 50. The users 20 and the primary user 24 may have profiles on the collaborative tool 50 in the collaborative environment, including logins, preferences, and personal data. The collaborative tool 50 may be accessible from a plurality of computers, e.g., using a shared network, and in one embodiment is accessible using the Internet or other methods collectively designated as communication techniques 14 in FIG. 1. The collaborative tool 50 may be hosted on a webserver computer 54 or multiple computers, and may include a microprocessor 56 for executing a program 58 embodied on a computer readable medium or a computer readable storage device 60. The program 58 may execute the steps of the method 100. Data, such as user profiles, photos, messaging, or other data relating to collaborations between and among participants, may be stored in a database 64.

FIG. 2 shows an exemplary method 100 of the present invention in one embodiment. In step 102, a set of attributes, e.g., elements important to the primary user 24, is established. These attributes may be elements of various data sources such as, for example, email messages, user profiles, postings, streaming data, etc. A posting, e.g., a post, can be a message sent to a newsgroup or a placement of text and/or other media on a website. The attributes, which may be stored in the database 64, can include, for example, subject, topic, first author (e.g., sender), previous author, relationship, manual importance flag, highlight flag, activity flag (e.g., follow-up, etc.), volume of conversation, location, culture and/or language. Other attributes can also be established.

The system establishes the attributes by analyzing the primary user's profile, existing rules and/or user's relationships, e.g., network of connections such as multi-level connections (described below) in accordance with social media applications. In addition, attributes can be established by analyzing content of messages, postings and/or data streams to and from the user, the user's location, language, and other sources. Examples for existing rules can include the following, in which a message can be, for example, an email message, a post, data transmitted in a stream, etc. When Ralph is the first author (sender) of a message, send the message to the Patenting folder (subject) and/or visually mark or flag the sender. This existing rule can be used to establish the attributes of "sender", "subject" and "highlight flag". Another existing rule example can be: when "the boss", typically a supervisor, is the sender of the message, mark the message as "high importance" (e.g., manual importance flag is "on"). From this existing rule, the attributes of "sender" and "manual importance flag" can be established. Other examples of existing rules are: when the subject of the message is Patenting, mark the message as follow-up (e.g., activity flag is "follow-up"); When the primary participant is at work, mark all related messages, e.g., messages from others who are also at work, as follow-up. In other examples, the language in which the message is written can be the basis of an existing rule; this could establish an attribute of "language". Similarly, an existing rule can accord with a user's profile. Further, other sources can be used to generate sets of attributes based on existing rules with respect to the other sources.

The system registers the importance of the established attributes by standard indicators, for example, a manually generated priority flag on the message if available, or other indicators, for example, the volume of correspondence between sender and recipient. In addition, the system may further use the registered importance of the attributes in a message, for example by performing secondary actions, such as forwarding or posting a comment, on messages that include one or more predetermined values of the attributes. The system can cache or store these 'importance attributes' and refresh, e.g. change, them when changes are made to relevant criteria. In one embodiment, the system can cache and refresh at predetermined time intervals, such as hourly or daily.

In step 104, a dynamic rule is generated. As discussed in more detail below, a dynamic rule may be applied to an activity stream (defined below) to determine commonality, e.g., common attribute values, among messages. The system can assign weight to the attributes in a message in an activity stream, the weights assigned based on the attribute's individual importance. The system can generate a dynamic rule if the sum total of attribute weights is sufficiently high, e.g., above a predetermined threshold. The dynamic rule may include attributes of the message that might not be included in an existing rule and/or aggregated sets of rules. In one aspect, a dynamic rule may modify an existing rule to include attributes of a message. This dynamic rule, newly generated or dynamically modified, can be cached or stored, and can be applied when ongoing similar communication is active.

For example, when existing rules for particular attributes are known, the aggregated set of rules and their attributes can be retrieved and broken down into 1-Rule components. In one aspect, the aggregated set of rules can be "when sender is Ralph or Sue or Jim, send the message to the Patenting folder and mark the message as 'needs reply'". The 1-Rule components can be Component of Attribute A implies Perform X. In one aspect, a 1-Rule component can be if the sender is Ralph ("Component of Attribute A"), then send the message to the Patenting folder ("Perform X"), and another 1-Rule component can be if the sender is Sue ("Component of Attribute A"), mark the message as "needs reply" ("Perform X"). Hence, in this example, there are 1-Rule components for each sender, e.g., Ralph, Sue, Jim, and for each action, e.g., send to Patenting folder, mark as "needs reply", resulting in six 1-Rule components.

When there is no known existing rule, a dynamic rule is generated and its aggregated set of rules is processed in a manner similar to that of an existing rule.

The message, e.g., its attributes, is compared to each of the 1-Rule Components to generate a weighted set. Thus the dynamic rule can be created from a known existing rule or can be newly generated. Continuing with the above example, the dynamic rule is created from the known existing rule of "when sender is Ralph or Sue or Jim, send the send the message to the Patenting folder and mark the message as 'needs reply'". This dynamic rule becomes an aggregated set of six rules in addition to the original dynamic rule. These include 1) when sender is Ralph, send the message to the Patenting folder; 2) when sender is Ralph, mark as 'needs reply'; 3) when sender is Sue, send the message to the Patenting folder; 4) when sender is Sue, mark as 'needs reply'; 5) when sender is Jim, send the message to the Patenting folder; 4) when sender is Jim, mark as 'needs reply'. In this example, determining the weights can be performed as follows. In one aspect, a weight is assigned in accordance with the existence of a particular attribute. For example, if the 1-Rule component includes the attribute "sender", then a weight is assigned to a message that corresponds to the rule, e.g., if attribute "sender" exists, assign weight of 4 (on a scale of 1-10). In another aspect, a weight is assigned in accordance with the value of the attribute, e.g., if attribute "sender" is "Ralph", assign weight of 7 (on a scale of 1-10); these weights are typically assigned when the dynamic rule is applied to the activity stream as discussed below. This example illustrates email rules and messages but information in other data formats and data streams can also be used.

If the weighted set (sum of all of the weights assigned to the 1-Rule components and/or to the information in the activity stream corresponding to the dynamic rule) is higher than a predetermined value, the message can be highlighted based on the graded importance of its weighted set. For example, when the weighted set value is 1, the message is displayed as white on black, when the weighted set value is 10, the message is displayed as green on black, and for values between 1 and 10, there are a gradient of the colors in between white and green. Other weighted values can be used, for example, a value between 0 and 1, and other colors and gradients of colors can be used.

In addition, when the system detects that a subset of the recipients of a message matches the attributes of an existing rule (either once or after repeated occurrences) the system can extend the rule dynamically to include the new attribute value, e.g., new email addresses. The system will keep a record of the dates and the frequency of messages that includes the newly created group. Once that frequency goes down to a settable threshold, the newly added addresses are purged and the rule is restored to its original state. This covers the case of temporary collaborations (e.g., a patent group and a temporary lawyer that is assigned to one of the disclosures).

In step 106, the dynamic rule is applied to the activity stream. The activity stream can be, for example, data streamed or transmitted via a network of connections such as multi-level connections in accordance with social media applications. A multi-level connection can be, for example, the situation when person A knows person B who knows person C, person A is considered to know person C. Also, when person A knows person D and person B knows person D, then person A is connected to person D via multiple levels, so that there is a multi-level connection between person A and person D. The streamed data can be text, video or other types of data. The system will mark the message to indicate that it meets the criteria for the dynamic rule. The mark can be done in any manner, such as setting a predetermined bit to a particular value in a header message, etc. The application of the rule to the message will distinguish the message uniquely based on the applied rule, in order for the message to be displayed with proper highlighting or color/gradient. One example of highlighting could be as simple as denoting the dynamic rule which is being used or applied, for example, denoting that the rule of traceability is being applied.

Typically, the dynamic rule is applied to messages in a current view, or a page size, which includes a predetermined number of messages. However, in another embodiment, the dynamic rule can be applied for a predetermined amount of time such as for one hour, one day, etc. In yet another embodiment, the dynamic rule can be applied for a predetermined number of messages, which can range from 1 to 10, 20 or 50 messages, etc.

In step 108, the points of commonality, e.g., common values between attributes such as between a sender and recipient, and the importance of the message are visually indicated using a predefined or custom highlight, that is, the applied rule is associated to a predetermined color or gradient or highlighting. For example, the custom highlight may be applied to the messages which fall outside the current rules but are highly correlated to these current rules. The system will update the message list, e.g., the list of messages (such as emails, postings, etc.) appearing on a display device, applying the appropriate highlight to the incoming message or post, based on the dynamic rule generated and on the associated indicator. In addition, the message list may group similarly highlighted messages to focus the content.

Figure 3:
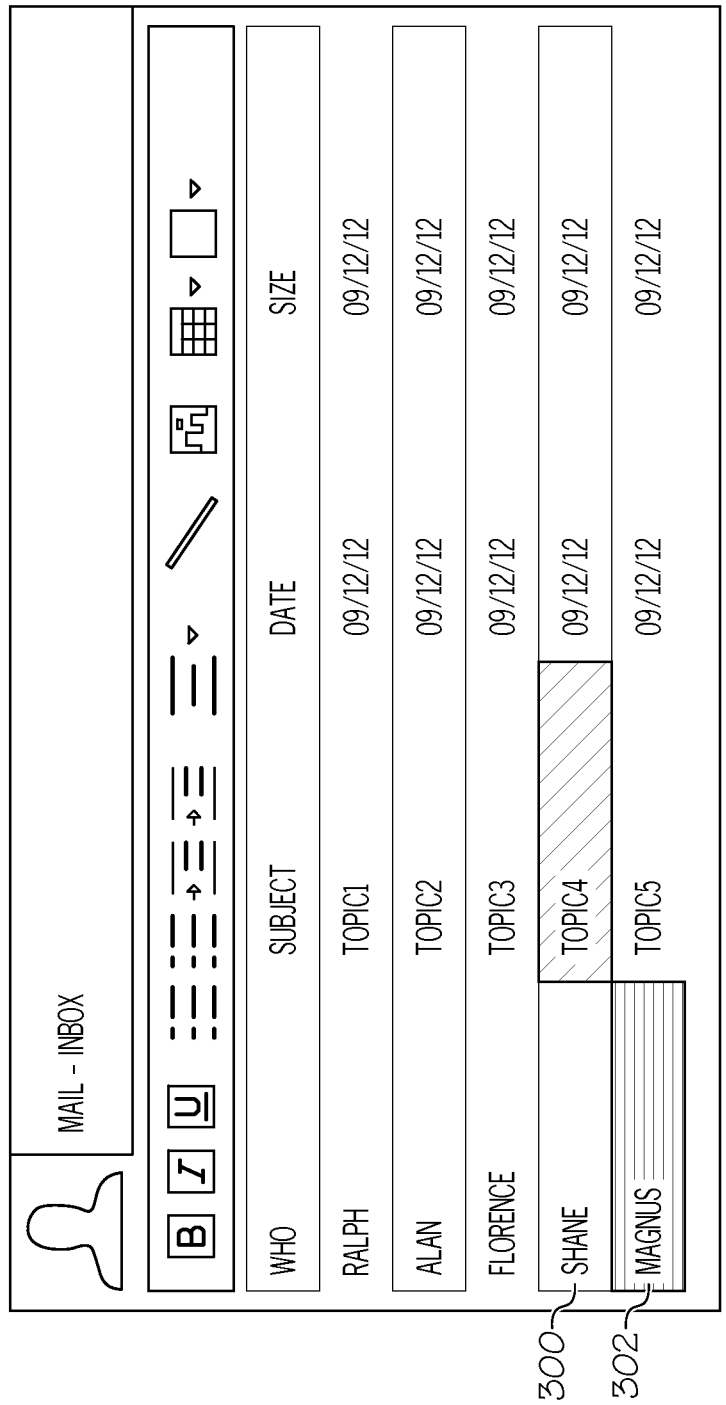
FIG. 3 illustrates visually indicating points of commonality and importance levels of messages according to one embodiment of the present disclosure.

FIG. 3 shows an email Inbox illustrating custom highlighting in one embodiment. The first three messages are not highlighted, the fourth message 300 has its subject "Topic4" highlighted in one shade or gradient of green and the fifth (bottom) message 301 has its sender "Magnus" highlighted in another gradient of green, different from the first gradient. This shows that in the fourth message, the point of commonality is the subject and in the fifth message, the point of commonality is the Who or sender.

An example use case scenario can be as follows. A primary user has a profile containing attributes including sender, subject, first author, highlight flag and activity flag, and a rule of "when sender is any of "Ralph", "Sue", "George", "Sally" and subject is "patent", then set the highlight flag to 'on'". First, a set of attributes is established, the attributes comprising sender, subject, activity flag, from the data source of the existing rule and its attributes in the user profile. Next, a dynamic rule is generated in accordance with the attributes. Specifically, importance attributes are calculated and weights are assigned to the attributes. For example, the sender attribute can be given a weight of 9 (on a scale of 1-10) and the subject attribute can be given a weight of 3 on the same scale. Then the dynamic rule is applied to an activity stream comprising the primary user's incoming email, to obtain points of commonality and to determine the importance level of the messages from the activity stream, e.g., incoming email. In this example, the existing rule of when sender is any of "Ralph", "Sue", "George", "Sally" and subject is "patent", then set the highlight flag to "on" is applied in accordance with the attributes and their weights. The dynamic rule is: When the sender (attribute) is not any of "Ralph", "Sue", "George", "Sally" but the message is sent to all of these people AND the subject of the message is "patent", the message has its highlight flag set to "on". In other words, incoming emails not only with the sender attributes identified in the existing rule but also with a previously unidentified sender sending to the existing rule senders and with the existing rule subject are dynamically processed according to the rule, e.g., have the highlight flag set to "on". Thus, the dynamic rule obtains messages with sender of "Ralph", "Sue", "George", "Sally", and/or a previously unidentified sender who is sending just to these senders and with subject of "patent" as points of commonality. Note that the dynamic rule may also change, for example, to include a subject of "invention", if the system determines that such a subject matches the attributes of an existing rule. Finally, the messages are displayed with the importance level as determined. For example, the messages are displayed with the sender displayed in a box of a predetermined color, where a dark green color is more important than a light green color.

In another example, an attribute of "current location" is established from the data source of the primary user's profile. A dynamic rule can be generated to flag messages that are sent from the same current location as the primary user and to display these messages with the level of importance of "requires follow-up". The messages can be displayed with the subject displayed in a predetermined color indicating this level of importance.

As discussed above, the schematic of an exemplary system for visual importance indication enhancement for collaborative environments is shown in FIG. 1, including representative users, and a computer system or processing system that may implement the method 100 (shown in FIG. 2) in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with one or more processing systems in the present disclosure may include, but are not limited to, personal computer systems, server computer systems, handheld or laptop devices, multiprocessor systems, microprocessor-based systems, programmable consumer electronics, network PCs, minicomputer systems, mainframe computer systems, cell phones, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. Computer system may include a variety of computer system readable media. Such media may be any available media that is accessible by computer system, and it may include both volatile and non-volatile media, removable and non-removable media. System memory 58, shown in FIG. 1, can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via input/output (I/O) interfaces. Additionally, computer systems can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, Visual Basic Script (VBS) or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present disclosure is limited to these particular embodiments. Thus, various changes and modifications may be effected by one skilled in the art without departing from the spirit or scope of the disclosure as defined in the appended claims.

We claim:

1. A system for visual importance indication enhancement for collaborative environments, comprising:
   a display device;
   at least one processor; and
   a computer readable storage medium storing instructions that, when executed by the at least one processor, configure the system to:
      analyze data sources associated with a primary participant to establish a set of attributes for the primary participant;
      break each attribute of the established set of attributes for the primary participant down into at least one single element component;
      generate at least one 1-Rule component based at least in part on the established set of attributes for the primary participant, each 1-Rule component including one of the single element components and a single corresponding action to be performed;
      assign a weight to each of the at least one 1-Rule components;
      sum the weights of the at least one 1-Rule components together;
      determine that the sum of the weights of the at least one 1-Rule components is greater than a pre-determined threshold;
      in response to determining that the sum of the weights of the at least one 1-Rule components is greater than the pre-determined threshold, generate a dynamic rule in accordance with the set of attributes;
      apply the dynamic rule to an activity stream comprising at least one message to obtain points of commonality between a participant and the primary participant and to determine an importance level of the at least one message, wherein the at least one message comprises a plurality of recipients, wherein applying the dynamic rule to the activity stream includes determining that each recipient in a subset of the plurality of recipients matches an attribute of the dynamic rule;

determine a frequency of messages of the activity stream that include the plurality of recipients;

determine that the frequency is below a pre-determined threshold frequency; and in response to determining that the frequency is below the pre-determined threshold frequency, restore the dynamic rule to its pre-extended state by removing the additional attributes corresponding to each recipient in the plurality of recipients that is not in the subset; and visually indicate the points of commonality and the importance level of the at least one message as a display on the display device.

2. The system according to claim 1, wherein each 1-Rule component comprises at least one of the attributes, and assigning a weight to each 1-rule component is performed based on an individual importance of the at least one of the attributes in the 1-Rule component.

3. The system according to claim 1, wherein the data sources comprise at least one of: at least one activity stream, user profile data, user relationships, existing rules, location, and language.

4. The system according to claim 1, wherein the activity stream includes at least one of: email messages, social network messages, social media messages and public bulletin board messages.

5. The system according to claim 1, wherein establishing a set of attributes comprises assigning weights to the attributes.

6. The system according to claim 1, wherein visually indicating comprises using a custom highlight.

7. The system according to claim 3, wherein the set of attributes for the primary participant are established based on attributes obtained from existing rules of the primary participant.

8. The system according to claim 7, wherein the importance levels of the established attributes are based on importance levels of the attributes obtained from the existing rules.

9. The system according to claim 7, wherein the instructions further configure the system to:

modify an existing rule to include an attribute of another of the data sources; and generate the dynamic rule based on the modification.

10. A non-transitory computer readable storage medium including instructions for visual importance indication enhancement for collaborative environments that, when executed by at least one processor, causes the at least one processor to:

analyze data sources associated with a primary participant to establish a set of attributes for the primary participant;

break each attribute of the established set of attributes for the primary participant down into at least one single element component;

generate at least one 1-Rule component based at least in part on the established set of attributes for the primary participant, each 1-Rule component including one of the single element components and a single corresponding action to be performed;

assign a weight to each of the at least one 1-Rule components;

sum the weights of the at least one 1-Rule components together;

determine that the sum of the weights of the at least one 1-Rule components is greater than a pre-determined threshold;

in response to determining that the sum of the weights of the at least one 1-Rule components is greater than the pre-determined threshold, generate a dynamic rule in accordance with the set of attributes;

apply the dynamic rule to an activity stream comprising at least one message to obtain points of commonality between a participant and the primary participant and to determine an importance level of the at least one message, wherein the at least one message comprises a plurality of recipients, wherein applying the dynamic rule to the activity stream includes determining that each recipient in a subset of the plurality of recipients matches an attribute of the dynamic rule;

determine a frequency of messages of the activity stream that include the plurality of recipients;

determine that the frequency is below a pre-determined threshold frequency; and in response to determining that the frequency is below the pre-determined threshold frequency, restore the dynamic rule to its pre-extended state by removing the additional attributes corresponding to each recipient in the plurality of recipients that is not in the subset; and visually indicate the points of commonality and the importance level of the at least one message.

11. The computer readable storage medium according to claim 10, wherein each 1-Rule component comprises at least one of the attributes, and assigning a weight to each 1-rule component is performed based on an individual importance of the at least one of the attributes in the 1-Rule component.

12. The computer readable storage medium according to claim 10, wherein the data sources comprise at least one of: at least one activity stream, user profile data, user relationships, existing rules, location, and language.

13. The computer readable storage medium according to claim 10, wherein the activity stream includes at least one of: email messages, social network messages, social media messages and public bulletin board messages.

14. The computer readable storage medium according to claim 10, wherein establishing a set of attributes comprises assigning weights to the attributes.

15. The computer readable storage medium according to claim 10, wherein visually indicating comprises using a custom highlight.

16. The computer readable storage medium according to claim 10, wherein the set of attributes for the primary participant are established based on attributes obtained from existing rules of the primary participant.

17. The computer readable storage medium according to claim 16, wherein the importance levels of the established attributes are based on importance levels of the attributes obtained from the existing rules.

18. The computer readable storage medium according to claim 16, wherein the instructions further cause the at least one processor to:

modify an existing rule to include an attribute of another of the data sources; and generate the dynamic rule based on the modification.

* * * * *